United States Patent
Hussain et al.

(10) Patent No.: US 8,064,462 B2
(45) Date of Patent: *Nov. 22, 2011

(54) SERVICE PROCESSING SWITCH

(75) Inventors: Zahid Hussain, San Jose, CA (US); Tim Millet, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,808

(22) Filed: May 17, 2010

(65) Prior Publication Data

US 2010/0220732 A1    Sep. 2, 2010

Related U.S. Application Data

(63) Continuation of application No. 12/123,443, filed on May 19, 2008, now Pat. No. 7,720,053, which is a continuation of application No. 10/163,260, filed on Jun. 4, 2002, now Pat. No. 7,376,125.

(51) Int. Cl.
*H04L 12/28* (2006.01)
*H04L 12/50* (2006.01)
*H04Q 11/00* (2006.01)
*G06F 15/173* (2006.01)

(52) U.S. Cl. ......... 370/395; 370/386; 370/397; 709/224

(58) Field of Classification Search .......... 370/230–235, 370/253–255, 312–352, 386–397; 709/217–224, 709/238–246; 714/14–21
See application file for complete search history.

(56) References Cited

U.S. PATENT DOCUMENTS

| | | | |
|---|---|---|---|
| 4,667,287 A | 5/1987 | Allen et al. | |
| 4,667,323 A | 5/1987 | Engdahl et al. | |
| 4,726,018 A | 2/1988 | Bux et al. | |
| 5,473,599 A | 12/1995 | Li et al. | |
| 5,490,252 A | * | 2/1996 | Macera et al. |
| 5,491,691 A | | 2/1996 | Shtayer et al. |

(Continued)

FOREIGN PATENT DOCUMENTS

WO    0051290    8/2000

(Continued)

OTHER PUBLICATIONS

Final Office Action for U.S. Appl. No. 12/260,524, mailed Oct. 18, 2010, 15 pages.
Non-Final Office Action for U.S. Appl. No. 12/467,304, mailed Oct. 18, 2010, 5 pages.
Non-Final Office Action for U.S. Appl. No. 12/467,609, mailed Nov. 5, 2010, 15 pages.

(Continued)

*Primary Examiner* — Man Phan
(74) *Attorney, Agent, or Firm* — Hamilton, DeSanctis & Cha LLP

(57) ABSTRACT

Methods and systems for providing IP services in an integrated fashion are provided. According to one embodiment, a system includes a switch fabric and a line interface/network module, multiple virtual routing engines (VREs) and a virtual services engine (VSE) coupled with the switch fabric. The line interface/network module receives packets, steers ingress packets to a selected VRE and transmits egress packets according to their relative priority. VREs determines if a packet associated with a packet flow requires processing by the VSE by performing flow-based packet classification on the packet and evaluating forwarding state information associated with previously stored flow learning results. The VSE includes a central processing unit configured to perform firewall processing, Uniform Resource Locator (URL) filtering and anti-virus processing. If the packet is determined to require processing by the VSE, then the packet is steered to the VSE for firewall, URL filtering and/or anti-virus processing.

11 Claims, 8 Drawing Sheets

U.S. PATENT DOCUMENTS

| | | | |
|---|---|---|---|
| 5,550,816 A | 8/1996 | Hardwick et al. |
| 5,581,705 A | 12/1996 | Passint et al. |
| 5,598,414 A | 1/1997 | Walser et al. |
| 5,633,866 A | 5/1997 | Callon |
| 5,745,778 A | 4/1998 | Alfieri |
| 5,825,091 A | 10/1998 | Adams |
| 5,825,772 A | 10/1998 | Dobbins et al. |
| 5,825,891 A | 10/1998 | Levesque et al. |
| 5,841,973 A | 11/1998 | Kessler et al. |
| 5,875,290 A | 2/1999 | Bartfal et al. |
| 5,963,555 A | 10/1999 | Takase et al. |
| 5,964,847 A | 10/1999 | Booth et al. |
| 5,987,521 A | 11/1999 | Arrowood et al. |
| 6,014,382 A | 1/2000 | Takihiro et al. |
| 6,032,193 A * | 2/2000 | Sullivan |
| 6,047,330 A | 4/2000 | Stracke |
| 6,069,895 A | 5/2000 | Ayandeh |
| 6,085,238 A | 7/2000 | Yuasa et al. |
| 6,098,110 A | 8/2000 | Witkowski et al. |
| 6,118,791 A * | 9/2000 | Fichou et al. |
| 6,137,777 A * | 10/2000 | Vaid et al. |
| 6,169,739 B1 | 1/2001 | Isoyama |
| 6,169,793 B1 | 1/2001 | Gowdin et al. |
| 6,173,399 B1 | 1/2001 | Gilbrech |
| 6,175,867 B1 * | 1/2001 | Taghadoss |
| 6,192,051 B1 | 2/2001 | Lipman et al. |
| 6,212,556 B1 | 4/2001 | Arunachalam |
| 6,220,768 B1 | 4/2001 | Barroux |
| 6,226,788 B1 | 5/2001 | Schoening et al. |
| 6,243,580 B1 | 6/2001 | Garner |
| 6,246,682 B1 | 6/2001 | Roy et al. |
| 6,249,519 B1 | 6/2001 | Rangachar |
| 6,260,072 B1 * | 7/2001 | Rodriguez |
| 6,260,073 B1 | 7/2001 | Walker et al. |
| 6,266,695 B1 | 7/2001 | Huang et al. |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,324,583 B1 | 11/2001 | Stevens |
| 6,330,602 B1 | 12/2001 | Law et al. |
| 6,338,092 B1 | 1/2002 | Chao et al. |
| 6,339,782 B1 | 1/2002 | Gerard et al. |
| 6,405,262 B1 | 6/2002 | Vogel et al. |
| 6,414,595 B1 | 7/2002 | Scrandis et al. |
| 6,434,619 B1 | 8/2002 | Lim et al. |
| 6,449,650 B1 | 9/2002 | Westfall et al. |
| 6,453,406 B1 | 9/2002 | Sarnikowski et al. |
| 6,463,061 B1 | 10/2002 | Rekhter et al. |
| 6,466,976 B1 | 10/2002 | Alles et al. |
| 6,487,666 B1 | 11/2002 | Shanklin |
| 6,526,056 B1 | 2/2003 | Rekhter et al. |
| 6,532,088 B1 | 3/2003 | Dantu et al. |
| 6,542,466 B1 | 4/2003 | Pashtan et al. |
| 6,542,502 B1 | 4/2003 | Herring et al. |
| 6,553,423 B1 | 4/2003 | Chen |
| 6,556,544 B1 | 4/2003 | Lee |
| 6,608,816 B1 * | 8/2003 | Nichols |
| 6,625,650 B2 | 9/2003 | Stelliga |
| 6,636,516 B1 | 10/2003 | Yamano |
| 6,639,897 B1 | 10/2003 | Shiomoto et al. |
| 6,640,248 B1 | 10/2003 | Jorgensen |
| 6,658,013 B1 | 12/2003 | de Boer et al. |
| 6,668,282 B1 | 12/2003 | Booth et al. |
| 6,680,922 B1 | 1/2004 | Jorgensen |
| 6,694,437 B1 | 2/2004 | Pao et al. |
| 6,697,359 B1 | 2/2004 | George |
| 6,697,360 B1 | 2/2004 | Gai et al. |
| 6,701,449 B1 | 3/2004 | Davis et al. |
| 6,738,371 B1 | 5/2004 | Ayres |
| 6,738,821 B1 | 5/2004 | Wilson et al. |
| 6,763,236 B2 | 7/2004 | Siren |
| 6,775,267 B1 | 8/2004 | Kung |
| 6,775,284 B1 | 8/2004 | Calvignac et al. |
| 6,778,502 B2 | 8/2004 | Ricciulli |
| 6,785,224 B2 | 8/2004 | Uematsu et al. |
| 6,785,691 B1 | 8/2004 | Hewett et al. |
| 6,807,181 B1 | 10/2004 | Weschler |
| 6,816,462 B1 | 11/2004 | Booth et al. |
| 6,820,210 B1 | 11/2004 | Daruwalla et al. |
| 6,822,958 B1 | 11/2004 | Branth et al. |
| 6,868,082 B1 | 3/2005 | Allen et al. |
| 6,883,170 B1 | 4/2005 | Garcia |
| 6,894,994 B1 | 5/2005 | Grob et al. |
| 6,907,039 B2 | 6/2005 | Shen |
| 6,920,146 B1 | 7/2005 | Johnson et al. |
| 6,920,580 B1 | 7/2005 | Cramer et al. |
| 6,922,774 B2 | 7/2005 | Meushaw et al. |
| 6,938,097 B1 | 8/2005 | Vincent |
| 6,944,128 B2 * | 9/2005 | Nichols |
| 6,944,168 B2 | 9/2005 | Paatela et al. |
| 6,954,429 B2 * | 10/2005 | Horton et al. |
| 6,980,526 B2 | 12/2005 | Jang et al. |
| 6,985,438 B1 | 1/2006 | Tschudin |
| 6,990,103 B1 | 1/2006 | Gollamundi |
| 7,020,143 B2 * | 3/2006 | Zdan |
| 7,042,843 B2 | 5/2006 | Ni |
| 7,042,848 B2 * | 5/2006 | Santiago et al. |
| 7,082,477 B1 | 7/2006 | Sadhasivam et al. |
| 7,096,495 B1 | 8/2006 | Warrier et al. |
| 7,116,679 B1 | 10/2006 | Ghahremani |
| 7,161,904 B2 * | 1/2007 | Hussain et al. ............... 370/230 |
| 7,187,676 B2 | 3/2007 | DiMambro |
| 7,221,945 B2 | 5/2007 | Milford |
| 7,225,259 B2 | 5/2007 | Ho et al. |
| 7,243,371 B1 | 7/2007 | Kasper et al. |
| 7,266,120 B2 * | 9/2007 | Cheng et al. ................. 370/390 |
| 7,278,055 B2 * | 10/2007 | Talaugon et al. ............... 714/21 |
| 7,293,355 B2 | 11/2007 | Lauffer et al. |
| 7,316,029 B1 | 1/2008 | Parker et al. |
| 7,324,889 B2 | 1/2008 | Arai et al. |
| 7,340,535 B1 * | 3/2008 | Alam ........................... 709/246 |
| 7,587,633 B2 * | 9/2009 | Talaugon et al. ............... 714/21 |
| 7,720,053 B2 | 5/2010 | Hussain |
| 7,761,743 B2 | 7/2010 | Talaugon |
| 7,801,155 B2 | 9/2010 | Wang |
| 7,843,813 B2 | 11/2010 | Balay et al. |
| 7,881,244 B2 | 2/2011 | Balay |
| 7,925,920 B2 | 4/2011 | Talaugon |
| 7,933,269 B2 | 4/2011 | Cheng |
| 7,957,407 B2 | 6/2011 | Desai |
| 7,961,615 B2 | 6/2011 | Balay |
| 2001/0028636 A1 | 10/2001 | Skog et al. |
| 2001/0033580 A1 | 10/2001 | Dorsey et al. |
| 2001/0043571 A1 | 11/2001 | Jang et al. |
| 2001/0048661 A1 | 12/2001 | Clear et al. |
| 2001/0052013 A1 | 12/2001 | Munguia et al. |
| 2002/0023171 A1 | 2/2002 | Garrett et al. |
| 2002/0062344 A1 | 5/2002 | Ylonen et al. |
| 2002/0066034 A1 | 5/2002 | Schlossberg et al. |
| 2002/0071389 A1 | 6/2002 | Seo |
| 2002/0075901 A1 | 6/2002 | Perlmutter et al. |
| 2002/0097672 A1 | 7/2002 | Barbas et al. |
| 2002/0097730 A1 | 7/2002 | Langille et al. |
| 2002/0099849 A1 | 7/2002 | Alfieri et al. |
| 2002/0150093 A1 | 10/2002 | Ott et al. |
| 2002/0152373 A1 | 10/2002 | Sun et al. |
| 2002/0186661 A1 | 12/2002 | Santiago et al. |
| 2002/0188711 A1 | 12/2002 | Meyer et al. |
| 2002/0191604 A1 | 12/2002 | Mitchell et al. |
| 2003/0026262 A1 | 2/2003 | Jarl |
| 2003/0033401 A1 | 2/2003 | Poisson et al. |
| 2003/0108041 A1 | 6/2003 | Aysan |
| 2003/0115308 A1 | 6/2003 | Best et al. |
| 2003/0117954 A1 | 6/2003 | De Neve et al. |
| 2003/0131228 A1 | 7/2003 | Tworney |
| 2003/0169747 A1 | 9/2003 | Wang |
| 2003/0200295 A1 | 10/2003 | Roberts et al. |
| 2003/0212735 A1 | 11/2003 | Hicok et al. |
| 2003/0223406 A1 | 12/2003 | Balay |
| 2004/0037279 A1 | 2/2004 | Zelig et al. |
| 2004/0042416 A1 | 3/2004 | Ngo et al. |
| 2004/0095932 A1 | 5/2004 | Astarabadi et al. |
| 2004/0095934 A1 | 5/2004 | Cheng et al. |
| 2004/0141521 A1 | 7/2004 | George |
| 2004/0199569 A1 | 10/2004 | Kalkunte et al. |
| 2005/0002417 A1 | 1/2005 | Kelly et al. |

| | | | |
|---|---|---|---|
| 2005/0055306 A1 | 3/2005 | Miller et al. | |
| 2005/0108340 A1 | 5/2005 | Gleeson et al. | |
| 2005/0113114 A1 | 5/2005 | Asthana | |
| 2005/0147095 A1 | 7/2005 | Guerrero et al. | |
| 2005/0163115 A1 | 7/2005 | Dontu et al. | |
| 2005/0213589 A1 | 9/2005 | Shih | |
| 2006/0087969 A1 | 4/2006 | Santiago et al. | |
| 2007/0291755 A1* | 12/2007 | Cheng et al. | 370/390 |
| 2009/0131020 A1 | 5/2009 | van de Groenendaal | |
| 2009/0225759 A1* | 9/2009 | Hussain et al. | 370/395.1 |
| 2009/0279567 A1 | 11/2009 | Ta et al. | |
| 2010/0011245 A1* | 1/2010 | Talaugon et al. | 714/21 |
| 2010/0142527 A1 | 6/2010 | Balay et al. | |
| 2010/0146098 A1 | 6/2010 | Ishizakl et al. | |
| 2010/0146627 A1 | 6/2010 | Lin | |
| 2010/0189016 A1 | 7/2010 | Millet | |
| 2010/0220732 A1 | 9/2010 | Hussain et al. | |
| 2010/0220741 A1 | 9/2010 | Desai et al. | |
| 2010/0281296 A1 | 11/2010 | Talaugon et al. | |
| 2011/0122872 A1 | 5/2011 | Balay | |
| 2011/0128891 A1 | 6/2011 | Sarkar | |

FOREIGN PATENT DOCUMENTS

| | | |
|---|---|---|
| WO | 0076152 | 12/2000 |
| WO | 0163809 | 8/2001 |
| WO | 0223855 | 3/2002 |
| WO | 03010323 | 12/2003 |

OTHER PUBLICATIONS

Lawrence, J. Lang et al. "Connecting Remote FDDI Installations with Single-Mode Fiber, Dedicated Lines, or SMDS." Jul. 1990; ACM SIGCOMM Computer Communication Review. vol. 20, Issue 3; pp. 72-82.
IEEE Potentials Publication; "Local Area Networks" Dec. 95/Jan. 96; pp. 6. http://www.ece.uc.edu/-paw/potentials/sample.
Office Action dated Oct. 18, 2007 for U.S. Appl. No. 09/663,483.
Office Action dated Oct. 16, 2007 for U.S. Appl. No. 09/661,130.
Office Action dated Nov. 28, 2007 for U.S. Appl. No. 09/952,520.
A lightweight Protocol for Interconnection Heterogenous Devices in Dynamic Environments, (c) 1999, obtained from the Internet at : http//ieeexplore.ieee.org/iel5/6322/16898/00778477.pdf.
The Guide to Computing Literature, Jairo A.: A Framework and Lightweight Protocol for Multimedia Network Management, vol. 8, Issue 1, published 2000, ISSN: 1064-7570.
Bookfinder4u.com: High Performance Networks by Ahmed N. Tantawy, ISBN-10: 0792393716, Published 1993, Lightweight Protocols.
Ipinfusion white paper: Virtual Routing for Provide Edge Application, obtained from the Internet at: http://www.ipinfusion.com/pdf/VirtualRouting_app-note_3rev0302.pdf, pp. 1-8.
Non-Final Office Action for U.S. Appl. No. 10/991,969, dated Feb. 20, 2008.
Non-Final Office Action for U.S. Appl. No. 10/273,669, dated Feb. 20, 2008.
Non-Final Office Action for U.S. Appl. No. 10/949,943 dated Feb. 14, 2008.
Restriction Requirement for U.S. Appl. No. 11/556,697, dated Mar. 13, 2008.
Order Construing Claims of the '125 and '311 Patents and Granting in Part and Denying in Part Pan's Motion for Summary Judgment of Non-Infringement for Case No. C-09-0036 RMW, *Fortinet, Inc.* v. *Palo Alto Networks, Inc.*, filed Nov. 8, 2010, 13 pages (redacted).
Office Action dated Aug. 1, 2007 for U.S. Appl. No. Appl. No. 10/163,260.
Amendment and Response filed on May 23, 2007 for U.S. Appl. No. 10/163,260.
Office Action dated Apr. 13, 2007 for U.S. Appl. No. 10/163,260.
Amendment and Response filed on Mar. 13, 2007 for U.S. Appl. No. 10/163,260.
Office Action dated Dec. 21, 2006 for U.S. Appl. No. 10/163,260.
Amendment and Response filed on Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483.
Restriction Requirement dated Mar. 22, 2004 for U.S. Appl. No. 09/663,483.
Office Action dated Sep. 11, 2007 for U.S. Appl. No. 09/661,637.
Amendment and Response filed on Jun. 20, 2007 for U.S. Appl. No. 09/661,637.
Office Action dated Feb. 8, 2007 for U.S. Appl. No. 09/661,637.
Amendment and Response filed on Mar. 6, 2006 for U.S. Appl. No. 09/661,637.
Office Action dated Dec. 23, 2004 for U.S. Appl. No. 09/661,637.
Amendment and Response filed on Aug. 5, 2004 for U.S. Appl. No. 09/661,637.
Office Action dated May 5, 2004 for U.S. Appl. No. 09/661,637.
Supplemental Amendment and Response filed on Sep. 17, 2007, 2007 for U.S. Appl. No. 09/663,457.
Amendment and Response filed on Nov. 12, 2004 for U.S. Appl. No. 09/663,484.
Office Action dated May 6, 2004 for U.S. Appl. No. 09/663,484.
Amendment and Response filed on Feb. 18, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471.
Amendment and Response filed on Nov. 2, 2006 for U.S. Appl. No. 09/894,471.
Office Action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 09/771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.
Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.

Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Amendment and Response filed on Aug. 10, 2007 for U.S. Appl. No. 10/163,260.
Notice of Allowance dated Dec. 1, 2004 for U.S. Appl. No. 09/661,636.
Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Apr. 29, 2007 for U.S. Appl. No. 09/661,130.
Office Action dated Dec. 28, 2006 for U.S. Appl. No. 09/661,130.
Amendment and Response filed on Mar. 6, 2006 for U.S. Appl. No. 09/661,130.
Office Action dated Oct. 18, 2004 for U.S. Appl. No. 09/661,130.
Amendment and Response filed on Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. No. 10/067,106.
Amendment and Response filed on Aug. 28, 2006 for U.S. Appl. No. 10/067,106.
Office Action dated Mar. 27, 2006 for U.S. Appl. No. 10/067,106.
Amendment and Response filed on Nov. 6, 2006 for U.S. Appl. No. 09/663,483.
Office Action dated Jul. 6, 2006 for U.S. Appl. No. 09/663,483.
Amendment and Response filed on Mar. 13, 2006 for U.S. Appl. No. 09/663,483.
Advisory Action dated Nov. 12, 2004 for U.S. Appl. No. 09/663,483.
Amendment and Response filed on Oct. 8, 2004 for U.S. Appl. No. 09/663,483.
Office Action dated Jun. 3, 2004 for U.S. Appl. No. 09/663,483.
Amendment and Response filed on Feb. 26, 2004 for U.S. Appl. No. 09/663,483.
Office Action dated Aug. 21, 2003 for U.S. Appl. No. 09/663,483.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.
Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.
Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.
Amendment and Response filed on Feb. 7, 2006 for U.S. Appl. No. 09/663,484.
Office Action dated Apr. 6, 2005 for U.S. Appl. No. 09/663,484.
Non-Final Office Action for U.S. Appl. No. 12/838,487 mailed Jul. 18, 2010.
Non-Final Rejection for U.S. Appl. No. 12/202,333 mailed Jun. 21, 2010.
Non-Final Rejection for U.S. Appl. No. 11/557,096, mailed Jun. 30, 2010.
Non-Final Rejection for U.S. Appl. No. 11/460,977, mailed Jul. 2, 2010.
Non-Final Rejection for U.S. Appl. No. 12/637,140, mailed Sep. 17, 2010.
Non-Final Rejection for U.S. Appl. No. 12/537,898, mailed Sep. 9, 2010.
Non-Final Rejection for U.S. Appl. No. 12/202,223, mailed Sep. 16, 2010.
Non-Final Rejection for U.S. Appl. No. 12/637,140, mailed Sep. 17, 2010.
Non-Final Rejection for U.S. Appl. No. 12/537,898, mailed Sep. 9, 2010.
Final Rejection for U.S. Appl. No. 12/202,223, mailed Sep. 16, 2010.
Non-Final Rejection for U.S. Appl. No. 12/202,333 mailed Jun. 21, 2010.
Non-Final Rejection for U.S. Appl. No. 11/460,977, mailed Jul. 2, 2010.
Non-Final Rejection for U.S. Appl. No. 12/477,124 mailed May 23, 2011.
Chan, Mun C. et al., "An architecture for broadband virtual networks under customer control." IEEE Network Operations and Management Symposium. Apr. 1996. pp. 135-144.
Chan, Mun C. et al "Customer Management and Control of Broadband VPN Services." Proc. Fifth IFIP/IEEE International Symposium of Integrated Network Management. May 1997. pp. 301-314.
Gasparro, D.M., "Next-Gen VPNs: The Design Challenge." Data Communications. Sep. 1999. pp. 83-95.
Hanaki, M. et al., "LAN/WAN management integration using ATM CNM interface." IEEE Network Operations Management Symposium, vol. 1. Apr. 1996. pp. 12-21.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.

Rao, J.R., Intranets and VPNs: Strategic Approach. 1988 Annual Review of Communications. 1998. pp. 669-674.

Tanenbaum, A.S., "Computer Networks." Upper Saddle River, N.J.: Prentice Hall PTR, 3rd Edition. 1996. pp. 348-364.

European Search Report for PCT/US03/37009 (Jul. 4, 2004) 2 pgs.

International Search Report for PCTUS03/17674. 6 pgs.

* cited by examiner

| PACKET TYPE | GROUP | DIFF SERV CLASS | ATM CLASS | QUEUE |
|---|---|---|---|---|
| CONTROL (E.G., SYSTEM MESSAGES) | 1 | EF | OAM | 1 |
| VOICE | 2 | EF GUARANTEED | CBR | 2 |
| LOW LATENCY | 3 | EF REGULAR | CBR | 3 |
| HIGH BANDWIDTH | 4 | AF | VBR | 4 |
| MEDIUM-HIGH BANDWIDTH | 4 | AF | VBR | 5 |
| MEDIUM BANDWIDTH | 4 | AF | VBR | 6 |
| LOW BANDWIDTH | 4 | AF | VBR | 7 |
| BEST EFFORT (E.G., FILE TRANSFER) | 4 | BE | UBR | 8 |

FIG.6

| CONNECTIVITY OPTION | FORM FACTOR | TOTAL QUEUES | TOTAL MEMORY |
|---|---|---|---|
| 1-PORT GIGABIT ETHERNET LX & SX | LINE INTERFACE | 8 FIXED SIZED | 2 MB SRAM |
| 1-PORT OC-12/STM-4 POS MM & SMIR | LINE INTERFACE | 8 FIXED SIZED | 2 MB SRAM |
| 4-PORT OC-3/STM-1 POS MM & SM | LINE INTERFACE | 8 FIXED SIZED | 2 MB SRAM |
| 9-PORT DS3C/DS3U/E3U | LINE INTERFACE | 24,000 VARIABLE SIZED | 128 MB SDRAM |
| 4-PORT OC-3/STM-1 ATM MM & SM | NETWORK MODULE | 64,000 VARIABLE SIZED | 128 MB SDRAM |
| 4-PORT OC-3/STM-1 CHANNELIZED MM & SM | NETWORK MODULE | 8,000 VARIABLE SIZED | 128 MB SDRAM |
| 1-PORT GIGABIT ETHERNET LX AND SX | NETWORK MODULE | 8 FIXED SIZED | 2 MB SRAM |
| 1+1-PORT OC-12/STM-4 ATM MM & SM | NETWORK MODULE | 64,000 VARIABLE SIZED | 128 MB SDRAM |
| 1+1-PORT OC-12/STM-4 POS MM & SM | NETWORK MODULE | 8 FIXED SIZED | 2 MB SRAM |

FIG.7

| OSI MODEL | IPNOS MODEL |
|---|---|
| APPLICATION LAYER | APPLICATION OBJECT (E.G., FIREWALL, AV) |
| PRESENTATION LAYER | |
| SESSION LAYER | |
| TRANSPORT LAYER | TCP/IP OBJECT (E.G., IP FORWARDING, NAT) |
| NETWORK LAYER | TCP/IP OBJECT (E.G., IP FORWARDING, NAT) |
| DATA LINK LAYER | LINK LAYER OBJECT (E.G., VLAN, DLCI) |
| PHYSICAL LAYER | DEVICE DRIVER OBJECT (E.G., ATM, DS3) |

SERVICE PROCESSING SWITCH

CROSS-REFERENCE TO RELATED APPLICATIONS

This application is a continuation of U.S. patent application Ser. No. 12/123,443, filed on May 19, 2008, now U.S. Pat. No. 7,720,053, which is a continuation of U.S. patent application Ser. No. 10/163,260, filed Jun. 4, 2002, now U.S. Pat. No. 7,376,125 issued May 20, 2008, both of which are hereby incorporated by reference in their entirety for all purposes.

This application is related to U.S. patent application Ser. No. 10/163,162, entitled "System and Method for Hierarchical Metering in a Virtual Router Based Network Switch," filed Jun. 4, 2002, now U.S. Pat. No. 7,161,904, to U.S. patent application Ser. No. 10/163,261 entitled "Network Packet Steering," filed Jun. 4, 2002, now U.S. Pat. No. 7,203,192, to U.S. patent application Ser. No. 10/163,073 entitled "Methods and Systems for a Distributed Provider Edge," filed Jun. 4, 2002, now U.S. Pat. No. 7,116,665, to U.S. patent application Ser. No. 10/163,071 entitled "System and Method for Controlling Routing in a Virtual Router System," filed Jun. 4, 2002, now U.S. Pat. No. 7,340,535, and to U.S. patent application Ser. No. 10/163,079 entitled "System and Method for Routing Traffic through a Virtual Router-Based Network Switch", filed Jun. 4, 2002, now U.S. Pat. No. 7,177,311, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2002-2010, Fortinet, Inc.

BACKGROUND

1. Field

Embodiments of the present invention generally relate to packet switching, and more particularly to a system and method for providing IP services in an integrated fashion.

2. Description of the Related Art

Internet or WAN service providers (SPs) operate in a crowded marketplace where cost effectiveness is critical. Cost control is, however, difficult. At present internetwork bandwidth is a commodity item with extremely tight margins. If the SP wishes to provide additional value-added services such as firewalls, the SP must install and configure expensive Customer Premises Equipment (CPE) at subscriber locations. Problems that arise often require a trip by a service technician to the subscriber's location. It can be difficult to add new services.

This model of value-added service delivery creates an expensive up-front capital investment, as well as significant operational expenses that are associated with onsite installation and management of thousands of distributed devices. The results are service delivery delays, increased customer start-up costs and/or thinner service provider margins.

Service providers need a way of escape from commoditized bandwidth offerings and from traditional equipment-intensive service delivery architectures that drain profits.

SUMMARY

Methods and systems are described for providing IP services in an integrated fashion. According to one embodiment, a system includes a switch fabric and a line interface/network module, multiple virtual routing engines (VREs) and a virtual services engine (VSE) all coupled with the switch fabric. The line interface/network module receives packets, steers ingress packets across the switch fabric to a selected VRE and transmits egress packets according to their relative priority. The selected VRE determines if a packet associated with a packet flow requires processing by the VSE by performing flow-based packet classification on the packet and evaluating forwarding state information associated with previously stored flow learning results based on a previously received packet of the packet flow. The VSE includes at least one central processing unit configured to perform firewall processing, Uniform Resource Locator (URL) filtering and anti-virus processing. If the packet is determined to require processing by the VSE, then the packet is steered across the switch fabric to the VSE for one or more of the firewall processing, the URL filtering and the anti-virus processing.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 6 is a table illustrating various packet types and corresponding groups, DiffServ classes, ATM classes and queues according to one embodiment of the present invention.

FIG. 7 is a table illustrating various connectivity options and corresponding form factors, total queues and total memory according to one embodiment of the present invention.

DETAILED DESCRIPTION

Figure 1:
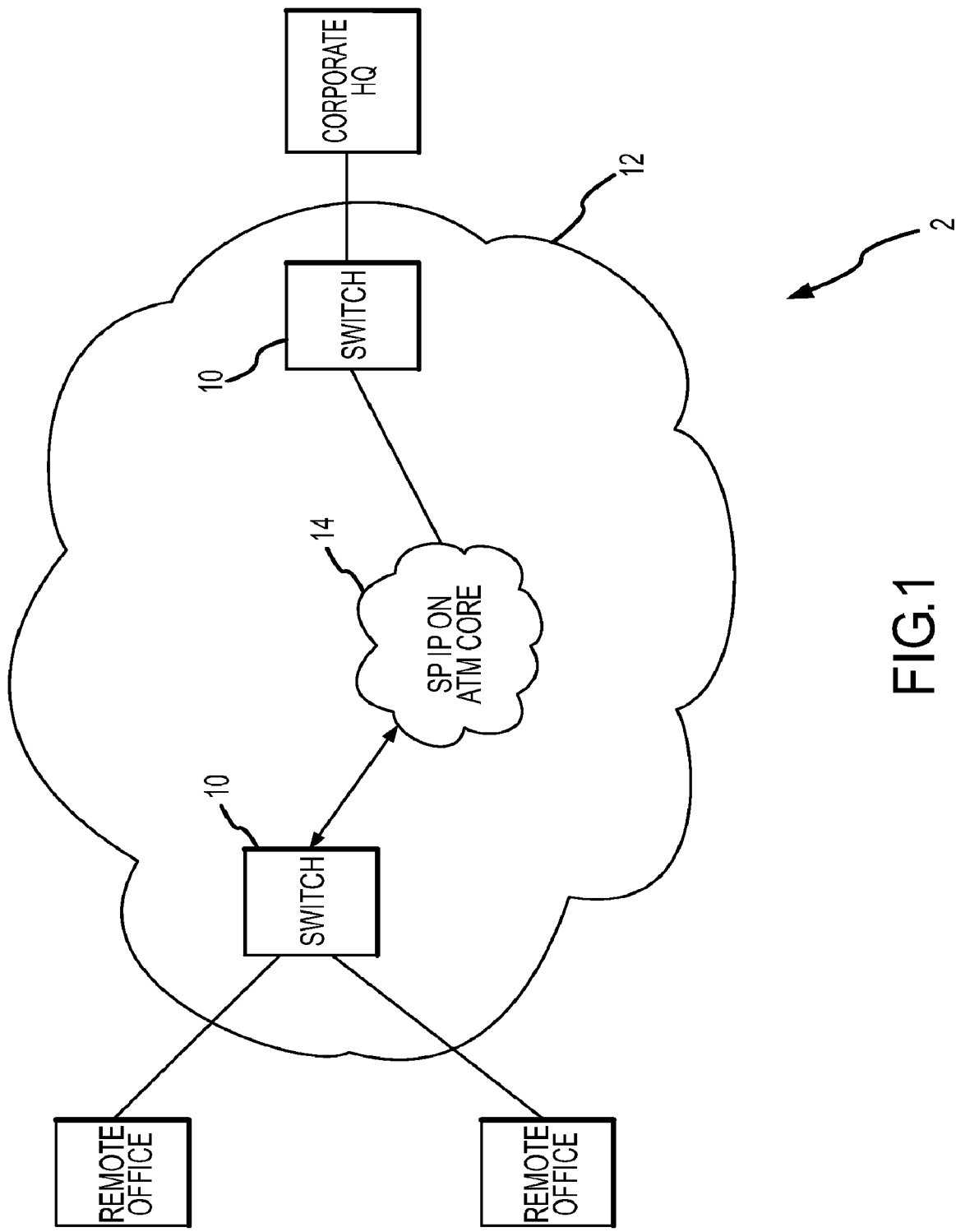
FIG. 1 is a block diagram of a service processing switch according to one embodiment of the present invention.

Methods and systems are described for providing IP services in an integrated fashion. In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

As noted above, traditional models of value-added service delivery create an expensive up-front capital investment, as well as significant operational expenses that are associated with onsite installation and management of thousands of distributed devices. The results are service delivery delays, increased customer start-up costs and/or thinner service provider margins.

A system 2 for providing such services in a more cost-effective way is shown in FIG. 1. Instead of requiring an array of CPE at subscriber locations in order to deploy IP services, system 2 includes one or more service processing switches 10 which enable a service provider to seamlessly infuse into and deliver from their network value-added IP services that can be bundled with subscribers' access services. In the embodiment shown, each switch 10 resides in the SP's Point of Presence (POP) 12. In one embodiment, switch 10 is installed at the edge of the core 14 and communicates with core routers within core 14. In one such embodiment the connection through switch 10 to each core router is enabled through a Service Provider Virtual Router (VR), which will be described below. In some such embodiments, switch 10 will function as an MPLS Label Edger Router (LER) establishing Label Switched Paths (LSPs) running through routers such as a Juniper M40 or a Cisco 12000.

Figure 2:
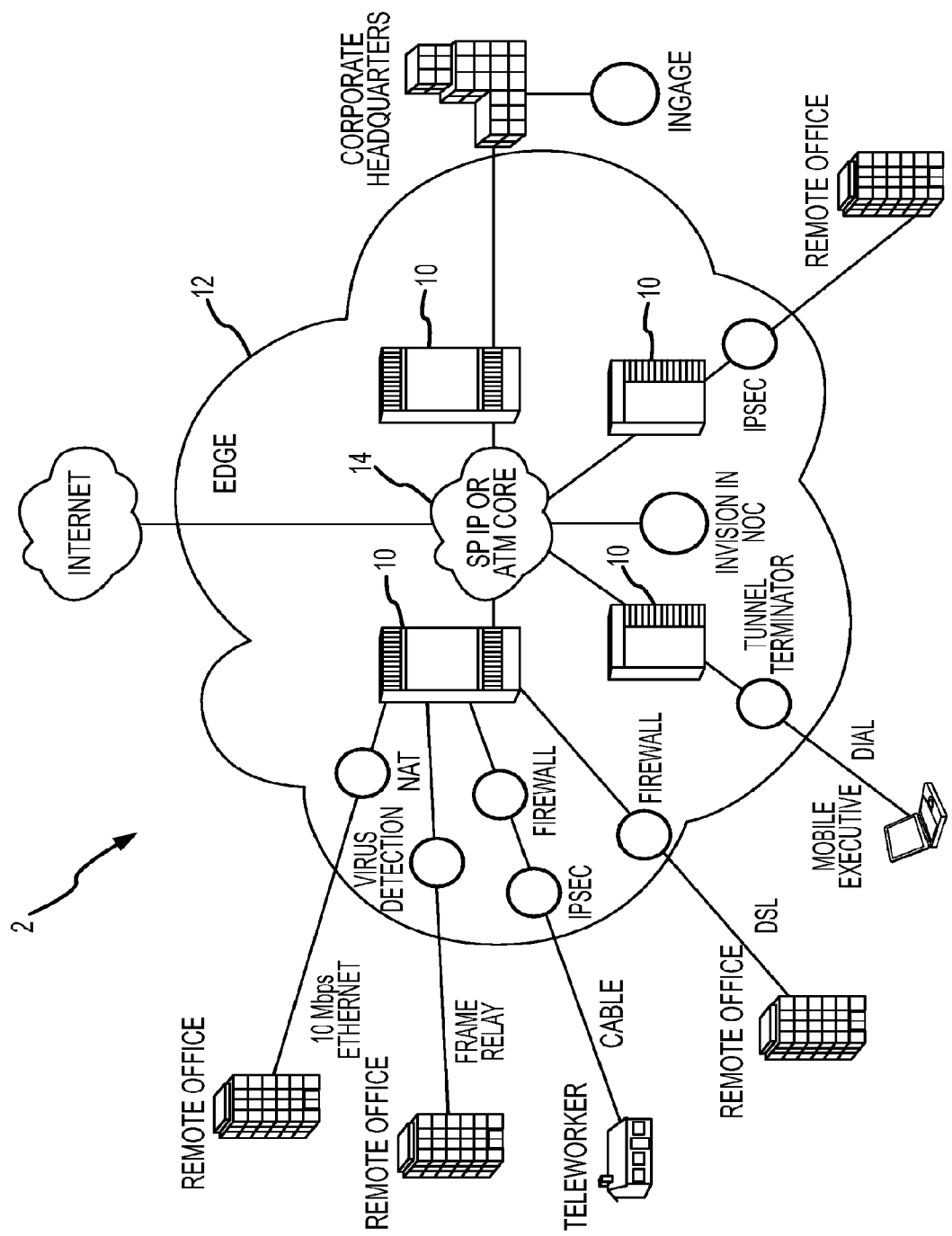
FIG. 2 conceptually illustrates an example of an IP Service Delivery Platform according to one embodiment of the present invention.

An example of an IP Service Delivery Platform 2 based on switch 10 is shown in FIG. 2. By deploying the IP Service Delivery Platform 2 of FIG. 2, SPs can overlay value-added services directly onto access offerings.

In one embodiment, switch 10 is a 26-slot, carrier-class solution that marries switching, routing, and computing resources with an open operating system, IPNOS. In one such embodiment, switch 10 leverages the architecture described in U.S. patent application Ser. No. 09/661,130, filed Sep. 13, 2000 through the use of new IP Service Generators (IPSGs) (see FIG. 3). This combination is a powerful solution that gives SPs the industry's only multi-gigabit rate solution for delivering value-added IP services over basic transport to enterprise subscribers. Additionally, the solution delivers the processing power required to scale value-added IP services to the speed of light, consolidates network equipment and reduces operational resources required for IP service delivery, enables user-level services customization and accounting without performance degradation and offers investment protection through a service processing migration path.

Figure 3:
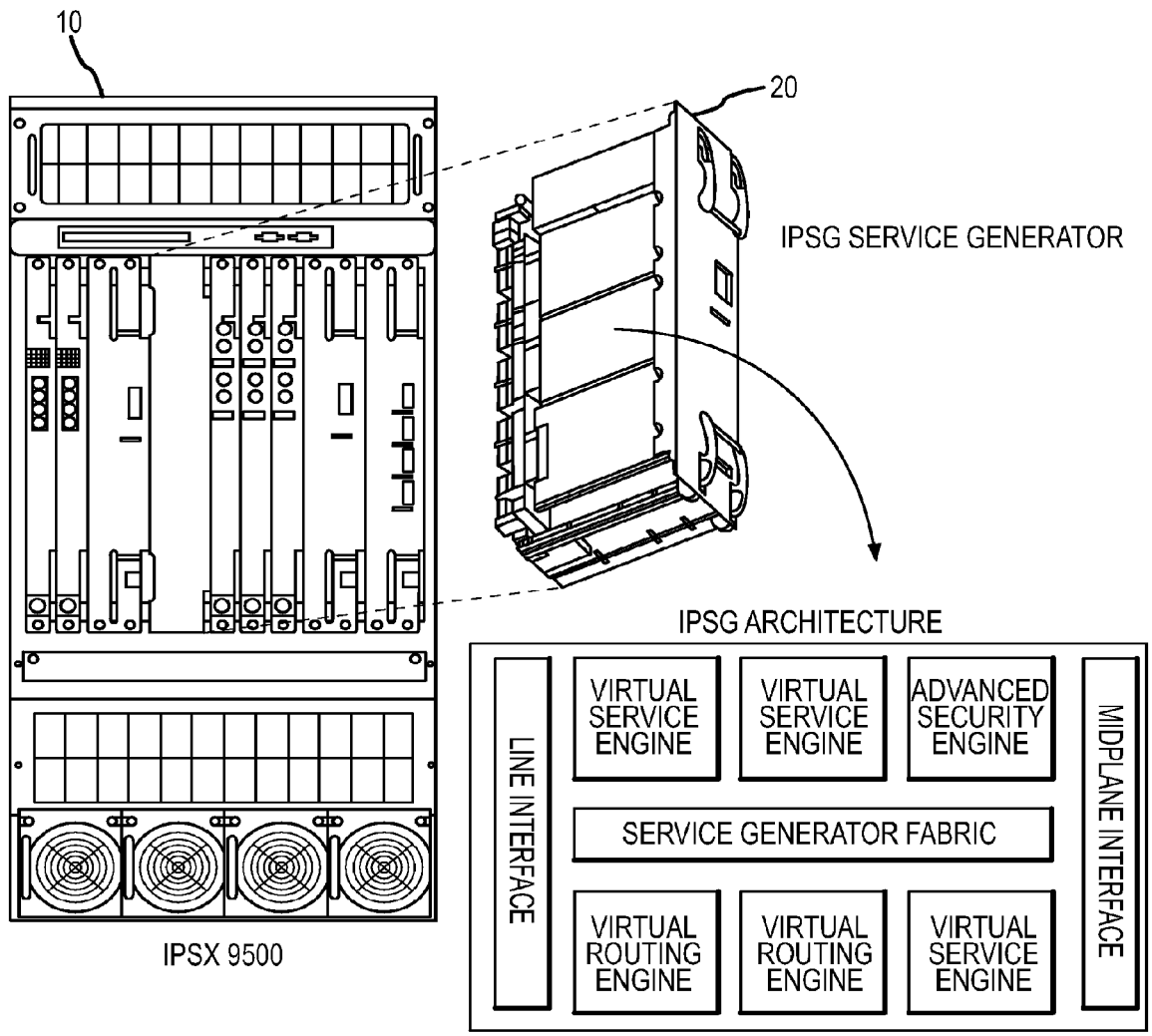
FIG. 3 illustrates the architecture of an IP Service Generator (IPSG) according to one embodiment of the present invention.

Service Providers can install up to 12 dual-slot IPSGs 20 in switch 10 of FIG. 3, choosing from a variety of interfaces: Gigabit, Ethernet, DS3/E3, POS and ATM. In addition, by using hardware-based routing and computing techniques such as parallel processing and pipelining, such an approach produces the highest aggregate IP services. In one such embodiment, each IPSG 20 scales to support tens of thousands of subscriber sites and a million unique ACL-based service definitions). A switch 10 fully loaded with IPSGs can scale application services across hundreds of thousands of enterprise network sites.

In one embodiment, each IPSG 20 is a self-contained subsystem with an advanced service processing architecture for delivering network-based IP services such as Virtual Private Networks (VPNs) and Managed Firewall at multi-gigabit per second rates (OC-48). The IPSG has been designed to match the capacity of Service Providers' edge transport build-outs so they can bundle value-added services seamlessly with their high-speed access services. In one embodiment, each IPSG 20 occupies two Universal slots when installed in a Service Processing Switch 10.

As noted above, the IPSG architecture produces the highest aggregate IP services processing rate in the industry by marrying hardware-based network processor capabilities with high-end computing techniques like parallel processing and pipelining. In one embodiment, an IPSG 20 optimizes performance through three application-tailored engines: a Virtual Routing Engine (VRE), a Virtual Services Engine (VSE), and an Advanced Security Engine (ASE).

The VRE enables packet classification, deep packet inspection and service customization for up to a million Access Control List (ACL)-level flows. The VSE performs parallel processing and pipelining, two high-end computing techniques that optimize network-based performance for third-party solutions such as Check Point FireWall-1 and McAfee anti-virus. The ASE rapidly accelerates encryption processing for EPSec site-to-site and dial VPNs through the use of specialized encryption hardware.

Figure 4:
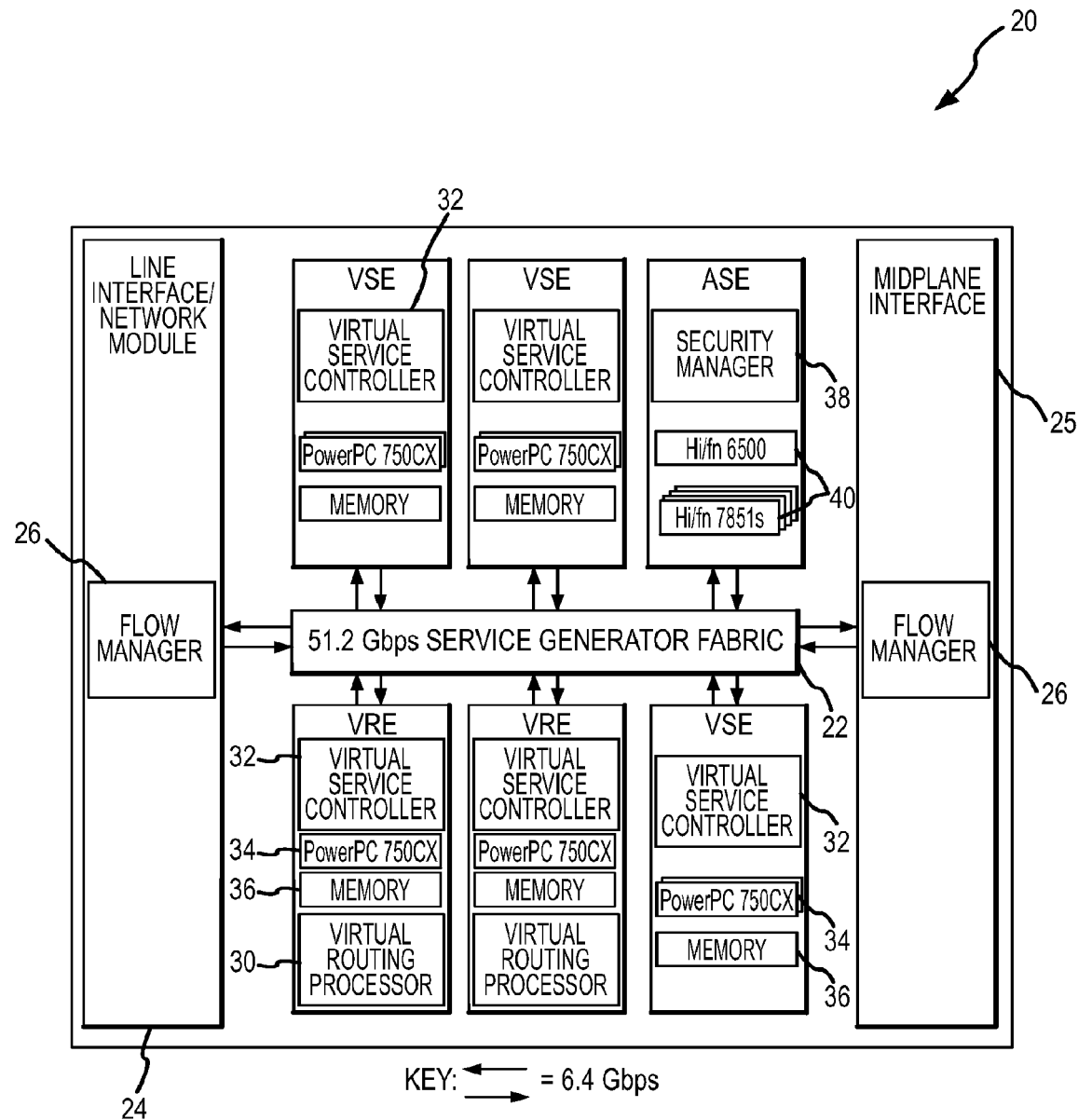
FIG. 4 illustrates an exemplary master architecture of an IP Service Generator (IPSG) according to one embodiment of the present invention.

In one embodiment, each IPSG 20 is based on the same master architecture (see FIG. 4). In the example shown in FIG. 4, the architecture is centered on a 51.2 Gbps, 8-port, fully meshed, non-blocking Service Generator Fabric 22. By intelligently partitioning out the processing elements and having them all communicate via the same high performance fabric 22, a modular and scalable services delivery architecture is possible. As a result, a varying number of processing elements—specifically, VREs, VSEs and ASEs—can be combined and pre-integrated with the Service Generator Fabric 22, Line Interface/Network Modules 24 and the Midplane Interface 25 into a family of IPSGs 20. Each IPSG 20 offers the optimum mix of scalable services, internetworking functions and performance for service providers from regional SPs all the way up to global carriers. By deploying additional IPSGs 20 in a single chassis, the services and performance of switch 10 can scale for an extremely long and profitable investment.

Although the processing requirements for network access and trunk environments have many aspects in common, such as network media, packet classification, virtual routing and packet forwarding, they do have significant differences in terms of scalability, depth of packet processing, computing power requirements and network interface bandwidth. Again, by intelligently partitioning out the processing elements into application-tailored engines such as the VRE, VSE and ASE, and by distributing functions across them, the services and functional requirements of both trunk and access environments are unified in the same architecture.

In one embodiment, each IPSG 20 employs pipelining across and within all its elements—Line Interface/Network Module 24, Service Generator Fabric 22, the Midplane Interface 25, VRE, VSE and ASE. Packet processing functions in Layers 3-7 are notoriously computation and memory intensive. Switch 10 takes advantage of the fact that Layer 3 packet functions, and in particular IP forwarding, are repetitive and can be performed in dedicated hardware. The CPUs in each VRE, VSE and ASE are coupled with specialized hardware that serve to offload from the CPUs the processing of basic network functions such as routing and packet forwarding. This leaves more MIPS and memory bandwidth that can be dedicated to upper layer packet processing such as firewall, URL filtering, anti-virus, etc.

As is shown in FIG. 4, in one embodiment, each VRE includes a virtual routing processor 30, a virtual service controller 32, a CPU 34 and memory 36. Each VSE includes a virtual service controller 32, two CPUs 34 and memory 36. Each ASE includes a security manager 38 and security hardware 40 used to accelerate security services such as encryption or key generation. In one embodiment, CPU 34 is a IBM PowerPC 750CX and security hardware 40 includes the Hi/fn 7851 (an encryption accelerator chipset supporting 500 Mbps of IPSec forwarding and hardware-based compression) and the Hi/Fn 6500 (a key accelerator enabling hardware-assisted Internet Key Exchange (IKE) negotiations and public key generation.

In one embodiment, a flow manager 42 residing on Line Interface/Network Module 24 and Midplane Interface 25 load balances service requests to the optimal VSE and VRE and supports robust priority/Weighted Round Robin (WRR) queuing capabilities. Virtual Routing Processor 30 provides hardware-assist capabilities for IP forwarding, MultiProtocol Label Switching (MPLS), Network Address Translation (NAT), Differentiated Services (DiffServ), statistics gathering, metering and marking. Virtual Service Controller 32 supports parallel processing and pipelining for optimum deep packet inspection and for third-party application computing. Security Manager 38 load balances and monitors IPSec sessions across a pool of four Hi/fn 7851 encryption chips for the highest capacity VPN processing possible.

In one embodiment, in order to achieve gigabit wire-speed packet data transfers from a physical port through the system and back out to another physical port and vice versa, all the system elements along the packet datapath throughout IPSG 20 are designed as full-duplex, high-bandwidth streaming interfaces. There is no packet data path bottleneck such as PCI or other peripheral IO interfaces. Using a full-duplex datapath of 32 bits and a minimum interface clock speed at 100 MHz, there is ample bandwidth headroom designed in to scale packet throughput to OC-48/STM-16 (2.4 Gbps) in each direction throughout the IPSG. Ample buffer size and the use of single-stage buffering techniques along the packet datapaths help absorb burstiness in IP traffic, as well as keeping a low packet loss ratio.

In one embodiment, flow manager 26 provides the following functions: wire-speed Layer 2 packet classification, wire-speed ingress packet flow direction, wire-speed egress priority queue-based congestion avoidance and bandwidth control and 50 ms intra-blade Automatic Protect Switching (APS) support for POS and ATM interfaces.

Figure 5:
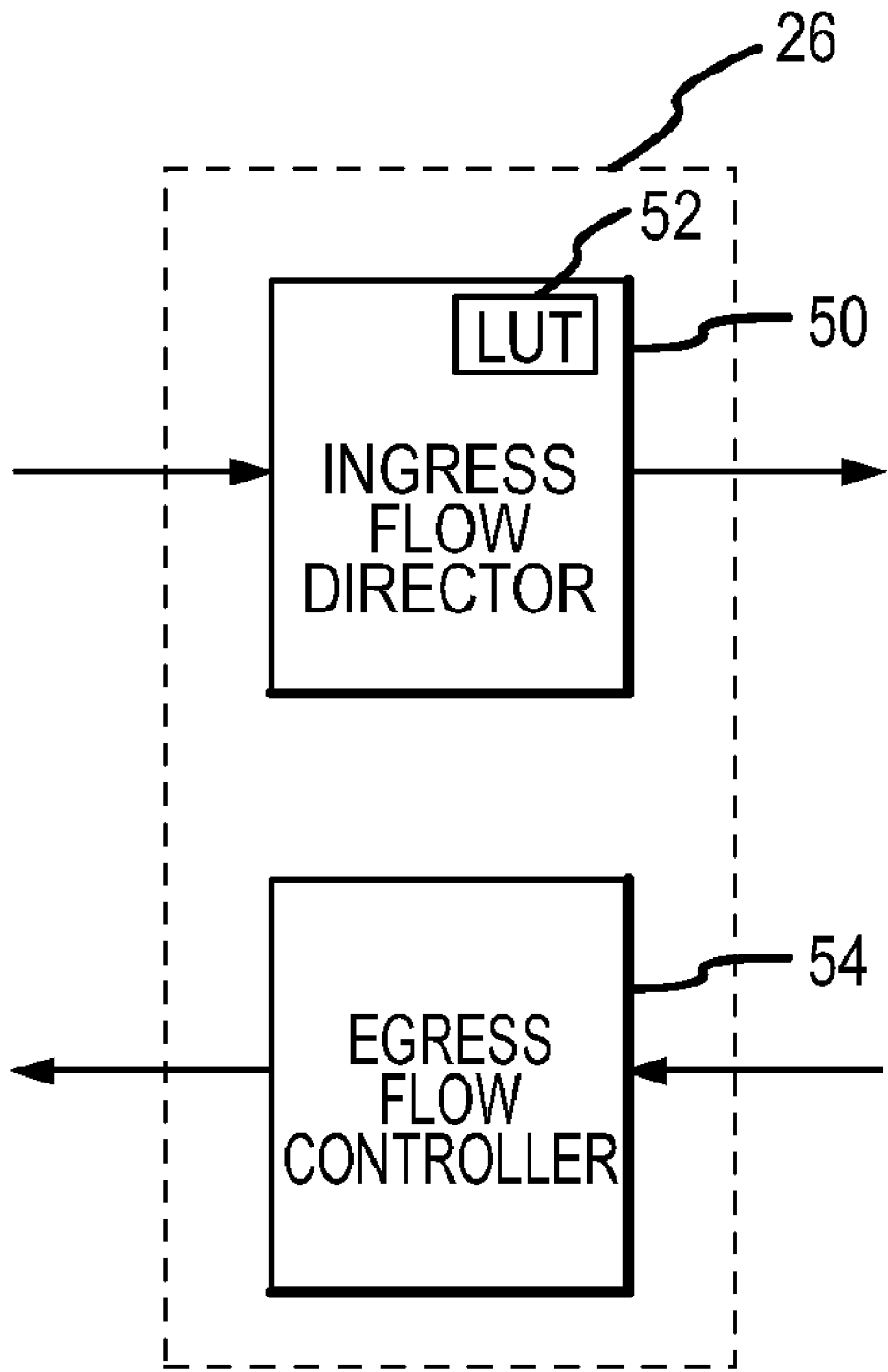
FIG. 5 is a block diagram of a flow manager according to one embodiment of the present invention.
Figure 8:
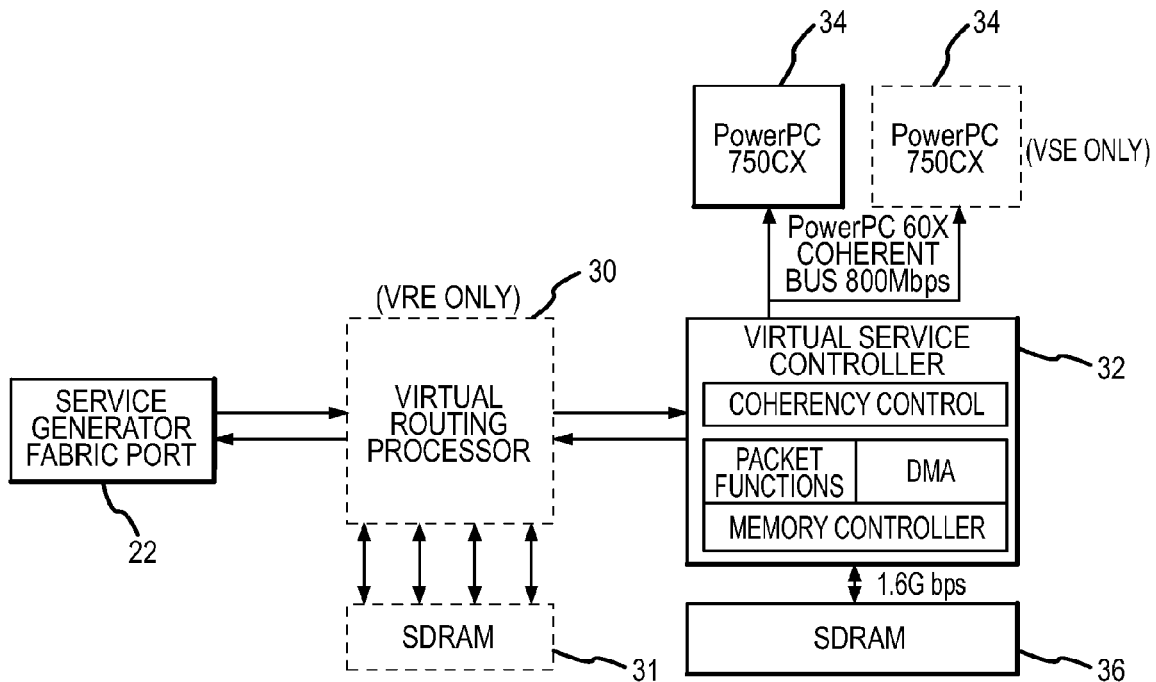
FIG. 8 is a block diagram of a Virtual Routing Engine (VRE) according to one embodiment of the present invention.

In one such embodiment, as is shown in FIG. 5, Flow Manager 26 consists of two parts: an ingress flow director 50 and an egress flow controller 54.

Layer 2 and 3 packet header parsing and error checking is performed on the fly as the packet enters Flow Manager 26 from the physical port. Layer 2 parsing supports PPP (RFC 1619, 1662), MLPPP (RFC 1990), Cisco HDLC, MultiProtocol over Frame Relay (RFC 2427), PPPoE (RFC 2516), Ethernet, VLAN, and MultiProtocol over ATM (RFC 2684).

Layer 3 parsing supports IP header definition (RFC 1812) and MPLS (IETF label standard). The result of this function is to ensure the packet is free of link layer and IP/MPLS header errors, to offset into the packet where the Layer 3 header begins and to determine what the Layer 3 protocol is (IP/MPLS/IS-IS). All this information is written into a system control header that Flow Manager 26 later uses to encapsulate the original packet.

Using a wire-speed table lookup mechanism, an ingress flow director within flow manager 26 assists traffic distribution by directing each incoming packet to one of several destination engines. The ingress flow director parses the Layer 2 header of each packet and extracts information to address a programmable SRAM-based lookup table 52. The extracted information is the packet's logical interface, which is associated with a Virtual Router (VR) in the Service Generator that contains the destination engine ID.

Using the lookup table result, Flow Manager 26 constructs an internal control header and prepends it to the incoming packet and sends the packet to Service Generator Fabric 22. Service Generator Fabric 22 looks at the destination field of the control header and determines to which of its client engines the packet should be sent. Software is responsible for initializing and updating the lookup table. Software gets information about the load of each engine by monitoring its internal states and packet statistics collected by the hardware circuits across engines. Programming an entry in the table is in the form of software writing an in-band high priority Programmed IO (PIO) message from an engine through Service Generator Fabric 22 into Flow Manager 26.

In one embodiment, hardware-assisted QoS mechanisms are distributed throughout the entire IPSG 20. In one such embodiment, egress flow controller 54 is responsible for priority queuing with congestion control using the WRED algorithm, as well as custom queue-based scheduling using a four-priority WRR algorithm. There are four different Priority Groups, each with absolute priority over subsequent groups (i.e., groups with a higher number). Group 4 has five queues and WRR is performed among those five queues to determine which queue is serviced when Group 4 is serviced. For the last four queues of Group 4, the weight per queue is a customer-configurable parameter.

The IPSG supports three levels of QoS: EF, AF and BE. EF provides premium-expedited service with low jitter and low delay. There are two types EF traffic: EF guaranteed and EF regular. EF guaranteed can be used by high priority traffic such as system network control and IP-based voice services. EF regular is lower priority than EF guaranteed, though still higher priority than all AF and BE traffic. AF traffic is higher priority than BE. Within AF, there are four subclasses: AF1, AF2, AF3 and AF4. These subclasses and BE are differentiated by weighted scheduling factors. A representative default priority queue QoS mapping is shown in FIG. 6.

In one embodiment, there are two different types of Line interface/Network Modules in the IPSG: those with fixed-sized queues and those with variable-sized queues. Fixed-sized queue Line Interface/Network Modules have a total of eight queues with 256 KB per queue, all the queues sharing a 2 MB shadow memory SRAM. The queues are shared across all the ports of the interface.

The variable-sized queue Line Interface/Network Modules introduce the concept of linking buffers together to dynamically allocate different sized queues. There are up to 8,000 channels per interface (the number of channels will change depending on the interface selected). Each of these channels has eight priority levels that are mapped to eight separate queues for each channel, resulting in the 64,000 queues. Each queue created is actually a link of 1 Kbyte buffers. Each buffer holds either a single packet or a partial packet but never data from two different packets. Each of the eight queues in each channel is a dynamically sized linked list. Each list can have 255 buffers of 1,024 bytes. Additionally, there exists 128 MB of external SDRAM for packet storage. The 128,000 buffers in this SDRAM are shared among the 8,192 QoS channels.

The priority queues are mapped to both IETF DiffServ traffic classes as well as ATM Forum traffic classes.

Layer 3 and 4 traffic classification, the actual determination of which egress queue a packet should be sent to, is based on DiffServ Type of Service (TOS) field marking, classification based on IP header fields, metering and rate control, which all take place in the Virtual Routing Processor on the VRE. A representative queue configuration is shown in FIG. 7.

The goal of the WRED algorithm is to randomly distribute the discarding of packets after a pre-determined level of congestion has been reached within the system. A discarded packet alerts the TCP layer that congestion is occurring in the system and that the sending side should back off its transmission of packets. Effective congestion control is time critical; in one embodiment, therefore, this function was placed completely in hardware. The alternative to WRED is known as "tail dropping", where significant numbers of packets are discarded at once causing the TCP layer to back off in waves, and thereby delivering poor bandwidth utilization.

For Line Interfaces/Network Modules 24 with fixed-sized queues, as a packet returns to an egress interface, it will be subject to the WRED drop determination algorithm. Based on the information in the internal control header, the queue number for the packet is determined. The probability of randomly dropping the packet is proportional to the average fill-level (fullness) of that queue and its software-programmable parameters such as Minimum Threshold (Minth) and Maximum Threshold (Maxth). The parameters are unique per priority queue and per drop preference. (Drop preference is described below. Drop preference is a result of DiffServ TOS field-based traffic marking and metering. There are three drop preferences: green, yellow and red. Red has the highest drop preference).

The drop preferences offer three drop profiles (based on three drop preferences) for each priority queue. The Minth controls the onset of the random packet dropping. This means as the queue is filled with packets, if the average fill level exceeds the Minth, random packet dropping is kicked in. The Maxth controls the onset of total packet dropping. This means that as the average queue level exceeds Maxth, all subsequent packets will be dropped. By manipulating these two thresholds, the level of fullness in a queue is controlled. If the queue is completely filled, it will block further traffic from getting into the queue.

If the packet is not dropped, it will be queued into one of the priority queues in a 2 MB of external shared memory SRAM, based on the information in the control header. The three highest priority queues are addressed in order. These queues must be empty before traffic from the fourth priority group is addressed.

A two-priority WRR packet scheduler determines from which of the five medium to lower priority queues the next packet will be sent to the outbound network. The weight for each of the five queues covers 16 Kb and is in 8 byte units. Each weight is software programmable and can be changed any time. The weight controls how many 8 byte units can be scheduled out of each queue. Once the weight is exhausted, the scheduler will move on to serve the next queue. Sometimes the weight is exhausted while the packet is still being scheduled. In this case, the remaining amount of 8 byte units will be recorded and deducted from the weight the next time the queue is served again. This is to improve bandwidth control for mixed-size packet traffic, such as TCP/IP.

It should be noted that all the data transfers in the various sub-blocks (such as WRED, WRR) are pipelined for wire speed.

For Line Interfaces/Network Modules 24 with variable-sized queues, the WRED parameters are uniquely defined on a per channel basis, not on a per queue basis. Instead of looking at the average fill level of that queue, these Line Interfaces/Network Modules 24 look at the average number of consumed buffers of the given channel. When a linked list queue in these Line Interfaces/Network Modules has consumed 255 buffers, tail dropping will occur. If the packet is not dropped, it will be queued into one of the priority queues in a 128 MB of external SDRAM memory based on the information in the control header. The three highest priority queues are addressed in the same manner as mentioned above, except that the weighting of the Priority Group 4 is based on buffers rather than bytes.

For its POS and ATM interfaces, in one embodiment IPSG 20 provides 1+1 APS, a physical failover mechanism within a Network Module 24. The 1-port OC-12 POS Line Interface doesn't support APS failover mechanism because it is limited to only one port. On the other hand, the 2-port 1+1 OC-12 POS Network Module does provide the APS capability; only one port will be active at any one time with or without APS applied. When using the 4-port OC-3 POS Line Interface or 4-port OC-3 ATM Network Module, all ports can be active simultaneously; if APS is activated in one pair of ports, the other two ports can be active resulting in three active ports in the Network Module 24. Software is responsible for detecting the conditions (receipt of SONET Physical Layer protocol K1 and K2 control bytes) that indicate a link failure.

For the ingress direction, the software programs Network Module 24 circuits to direct ingress traffic from either the primary port or the protect port across the Service Generator Fabric 22. For the egress direction, the software programs the Network Module 24 circuits to mirror egress traffic onto both working and protect ports. The failover time meets the Bellcore-GR-253 standard of 50 ms. 1+1 APS is optional per port pair. For multi-port interfaces, each 1+1 APS port pair is independent of the others.

Service Generator Fabric 22 is the heart of IPSG 20. It is a fully meshed, 8-port shared memory switch that provides full-duplex communication between any pair of ports. The ports are non-blocking. All system-wide packet traffic as well as control messages pass through Service Generator Fabric 22. Service Generator Fabric 22 treats control messages with a higher priority than packet traffic. The Service Generator Fabric 22 employs a shared memory architecture with a total aggregated throughput of 51.2 Gbps. Ports can be attached to VREs, VSEs, ASEs, the Line Interface/Network Module 24 and the Midplane Interface 25.

The full-duplex communication link for each port pair runs at 3.2 Gbps in each direction, using a time-division streaming data interface protocol. In one embodiment, the time division allows the Service Generator Fabric 22 to serve each of eight input and output port with equal 32 byte size time slots, in round robin fashion, all at OC-48/STM-16+ rates. Other priority schemes can be implemented as needed.

In one embodiment, all the ports feeding data into and taking data out of the Service Generator Fabric 22 are store-and-forward to minimize the per packet transit time through the Service Generator Fabric 22.

When a packet is ready to be transferred from a Line Interface/Network Module 24 ingress to a destination VRE, it is streamed over to the Service Generator Fabric 22 shared memory in 32 byte chunks at OC-48/STM-16+ rates. Service Generator Fabric 22 examines the destination port's availability and then starts to stream the packet over to the destination port in 32 byte chunks at OC-48/STM-16+ rates.

At the same time, if a Service Generator Fabric port has a packet destined for a Line Interface/Network Module egress, it will also be streamed over to the Service Generator Fabric shared memory in 32 byte chunks at OC-48/STM-16+ rates. This time-shared cut-through protocol allows the shared memory to remain small (32 Kbytes).

Because the Service Generator Fabric is the single most traveled path by all packets, it has built in reliability. All port links are protected by Cyclical Redundancy Checking (CRC). CRC is an error detection mechanism that prevents bad packets from propagating beyond one pass through Service Generator Fabric 22.

As noted above, in one embodiment, the basic computing resources in a VSE and a VRE consist of 600 MHz IBM PowerPC 750CX CPUs. These CPUs offer advanced computing features such as two levels of internal caches and instruction execution optimization 3. Each CPU delivers 1200 MIPS; a fully populated IPSG 20 can offer as much as 10,800 MIPS, and a fully loaded switch 10 can deliver 130,000 MIPS.

A powerful multi-processing CPU enables high-level software, applications and underlying computing processes to execute at the highest possible speed. These CPUs can also work efficiently together in parallel to share computing data structures and workload.

Figure 9:
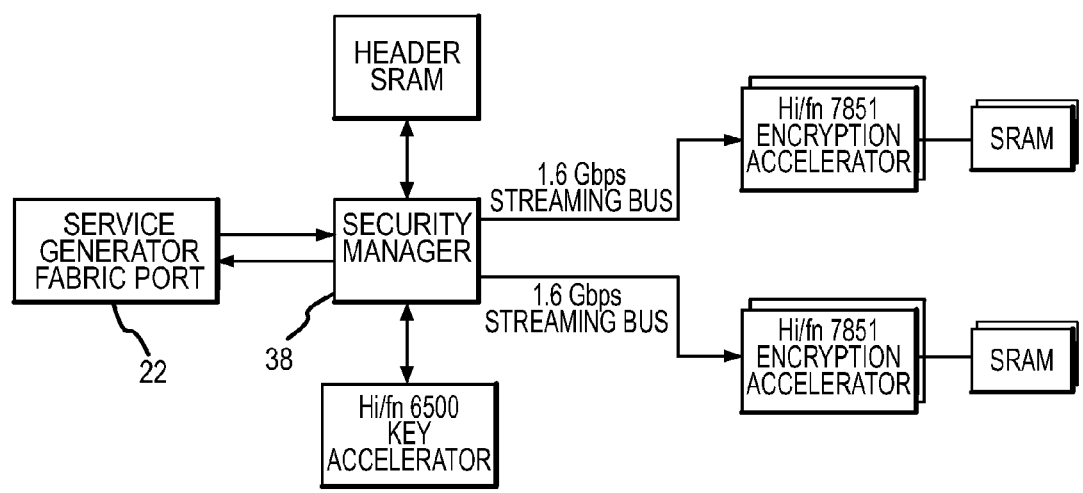
FIG. 9 is a block diagram of an Advanced Security Engine (ASE) according to one embodiment of the present invention.

In order to deliver a world-class services switching platform that moves and processes packets at high rates, in addition to executing software programs and processes, the multiple CPUs on the VSE and VRE are coupled with the Virtual Service Controller for accelerating virtual services packet processing and the Virtual Routing Processor for accelerating virtual routing functions. In one embodiment, the VSE and VRE can be thought of having a unified architecture (see FIG. 9). The VSE has one more CPU than the VRE, while the VRE has the Virtual Routing Processor and its associated memory 31.

Packet movement in and out of memory has been shown to be a bottleneck in server-based routers because the SDRAM-based memory subsystem is designed for the needs of data transfer, not packet transfer. Packet transfer does not use memory bandwidth as efficiently as data transfer. Sixty-four byte packets with random arrival and departure can cut memory efficiency by 40 percent or more. Moreover, in those routers, the packets originate and end on add-on I/O cards that are subject to I/O bus bottleneck. The typical I/O bus is a PCI-66, which at its best cannot support full OC-12/STM-4 rate.

In more conventional routers, e.g., Cisco routers, I/O bottleneck is eliminated but the CPU and memory subsystem performance is below that of server-based routers. These routers were not purpose-built to run services like VPNs, firewall or anti-virus. Furthermore, both types of routers cannot support more than a dozen routing instances in one box.

In one embodiment, these issues have been addressed within the multi-CPU memory subsystem by introducing advanced system memory and packet transfer control.

In one such embodiment, the packets in transit through the VSE or VRE are stored in the 1 GB external main memory 36, much like a server-based router. However, that is where the similarity ends. A server-based conventional router fetches network I/O packet transfer control information from software-controlled data structures in main memory across an I/O bus, typically a PCI bus. The same I/O bus is also used for packet transfer. In the IPSG 20 Virtual Service Controller 32, packet transfer control information is stored and managed at wire speed entirely in the local hardware. Software control of the data structures uses a separate interface and does not compete with actual packet transfer for main memory bandwidth. This way, main memory bandwidth is optimized for packet transfer.

The main memory bandwidth is still shared between data transfer (for CPU to run services) and packet transfer. The Virtual Service Controller includes a super high-performance (12.8 Gbps) memory controller. Innovative design technique using pipelined interface protocol and optimized memory access arbitration make this high performance possible. Both data and packet transfers can take advantage of this high bandwidth.

In one embodiment, the virtual routing function within the virtual routing processor 30 is micro-code based and supports a RISC-like instruction set. Packet classification and fast path packet forwarding are performed in hardware at wire speed, with the flexibility needed to stay current with the ever-evolving Internet standards. The CPUs are offloaded to dedicate more resources to running applications and software processes. The virtual routing function provides fast path packet forwarding for established flows. (In this embodiment, a flow is an ACL-level flow. An ACL is an ordered set of rules in a table that associates a group of packet header fields to the action that needs to be performed on such packets with matching header fields. For TCP/IP, for example, the header fields include internal control ID, IP source and destination addresses, TCP/UDP source and destination port numbers, IP TOS field and Layer 3 protocol field.)

The virtual routing function adapts design techniques from superscalar computing architecture, where there are a number of identical execution units in parallel, all executing the same program simultaneously but on different packets. Each unit is furthered pipelined into stages to allow overlapped packet processing. This is necessary to meet the gigabit wire-speed requirement for thousands of simultaneously active VRs.

A packet typically arrives from a Line Interface/Network Module 24 through the Service Generator Fabric 22 into one of the packet classifiers in the Virtual Routing Processor 30. In one embodiment, the packet's flow index is identified by extracting various Layer 2-4 fields of the packet header such as IP TOS, protocol, source address, destination address fields, TCP/UDP source and destination port fields. The packet classifier executes micro-code instructions to extract bit and byte fields and even perform Boolean functions for this purpose. In one embodiment, a hash function is applied to the contents of the fields to obtain an address into a flow cache storing a predetermined number of forward indexes.

Upon a match in the flow cache, a forward index is obtained to address another table that contains the blueprint for packet field manipulation, that is, packet processing. For example, the blueprint can specify the action for firewall filtering, which is to drop the packet. Another example is the act of routing, which includes substituting the Layer 2 destination address with next hop value, decrementing Time-To-Live (TTL) and performing IP header checksum adjustment. A third example is NAT, which includes substituting original IP source and/or destination address, TCP/UDP source and/or destination port values. A fourth example is DiffServ TOS field marking, flow metering and rate control. A fifth example is to update packet statistics to support event logging. Yet another example is GRE tunneling, which includes the encapsulation of the original packet header by another packet header.

The blueprint can also specify that the packet be processed, such as the case of URL filtering or anti-virus scanning, which requires parsing of packet payload by a general CPU. Before a flow is set up by software, all packets arriving at the packet classifiers will be sent to software for first time forwarding. Software running on the CPUs 34 sets up routing tables and forwarding information bases as well as the packet processing action table entries associated with each established flow. Thereafter, all packets will be sent to the outbound network interface without ever being touched by software, as long as the flows they belong to are cached in the flow cache. In one embodiment, VRE performance is at 3 Million packets per second (Mpps).

The routing processes described above are described in greater detail in U.S. Pat. No. 7,177,311, the descriptions of which are incorporated herein by reference.

DiffServ QoS support in Virtual Routing Processor 30 includes TOS field update and rate control. Rate control includes packet rate metering, marking and dropping functions. Rate control comes in several flavors, which are not mutually exclusive: Ingress rate control based on the VI, rate control based on the flow to which the packet belongs, and egress rate control after the packet is routed and forwarded.

In one embodiment, rate metering and marking is implemented completely in hardware for each flow. The hardware supports the concept of the color-blind and color-aware packet. In color-blind mode, the incoming packet color is ignored, and any color can be added to the packet. In color-aware mode, the incoming packet color is taken into consideration. In this case, the incoming packet can be green, yellow or red. Green packets have the lowest probability of being dropped and will be dropped last if necessary. If the incoming packet is green, the packet can stay green or it can be downgraded to yellow or red; a packet can never be upgraded.

The two-rate three-color metering based on RFC 2698 marks its packets green, yellow or red. A packet is marked red if it exceeds the Peak Information Rate (PIR). Otherwise it is marked either yellow or green depending on whether it exceeds or doesn't exceed the Committed Information Rate (CIR). It is useful, for example, for ingress policing of a service where a peak rate needs to be enforced separately from a committed rate. The packet's color is encoded in the internal control header of the packet and will be interpreted by Flow Manager 26 for congestion control purpose. The metering context is stored in main memory. The metering context contains status and state information, such as number of bytes metered green, yellow and red, the PIR in bytes/time slot, CIR in bytes/time slot, etc. This metering context is updated every time a packet is processed.

The QoS processes are described in U.S. Pat. No. 7,161,904, U.S. Pat. No. 7,116,665 and U.S. Pat. No. 7,177,311, the descriptions of which are incorporated herein by reference.

The Advanced Security Engine (AES) will be described next.

Creating, terminating and transporting IPSec tunnels is an integral part of IPSec-based VPNs, and encryption, decryption and authentication processes are an integral part of any secure transaction. These are all notoriously computation-intensive functions. The ASE consists of four Hi/fn 7851 encryption accelerators, a Hi/fn 6500 key accelerator and a Security Manager 38 (see FIG. 9). Security Manager 38 performs the following functions: load balancing and managing security sessions across four Hi/fn 7851 encryption accelerators for wire speed throughput at 1+ Gbps, facilitating programming of registers for four Hi/fn 7851 encryption accelerators and one Hi/fn 6500 key accelerator and providing system control header and security command message header translation.

The Hi/fn 7851 security processor features an embedded RISC CPU that performs all the packet header and trailer processing at 155 Mbps for back-to-back minimum size packets and at 622 Mbps for back-to-back maximum size 1500 byte packets. For each Hi/fn 7851, a 64 MB SDRAM is used to store over 16,000 active security associations (with a theoretical maximum of 230,000). The Hi/fi 7851 processor provides the following functions for IPSec: 3DES/RC4 encryption/decryption for packets to/from access (subscriber) side, IPSec header (ESP/AH) encapsulation and parsing, SHA or MD-5 authentication service for packets to/from access (subscriber) side, support for Public Key Infrastructure (PKI) with RSA/Diffie-Hellman/DSA key algorithms and, optionally, LZS/MPPC-based compression/decompression for packets to/from access (subscriber) side.

Packets that have been classified by the VRE arrive at the ASE for IPSec tunnel creation or termination. Security Manager 38 decodes the security session ID for the packet. Then it strips off the system control header and stores it in a SRAM. Security Manager 38 creates and prepends a Hi/fn command message header to the original packet, directing it to the corresponding Hi/fn 7851. The Hi/fn 7851 performs authentication and encryption or decryption services. In the case of encryption, encryption is applied to the IP packet and an IPSec ESP/AH header is prepended to it. The EPSec header is pieced together from information contained in the original packet control header as well as the Hi/fn results header. This ensures the QoS information in the original EP header is preserved.

At a given time, all four Hi/fn 7851s can be in various states of processing of up to a total of four packets. The streaming bus is non-blocking; that is, a smaller packet destined to one Hi/fn 7851 will not be blocked behind a large packet to another Hi/fn 7851. This ensures that the ASE optimizes the aggregate throughput of all the Hi/fn 7851s combined.

The Midplane Interface 25 is where packets leave the IPSG to go to another IPSG 20 or where packets arrive from another IPSG 20. In one embodiment, Midplane Interface 25 is a 22 Gbps dual counter-rotating ring structure that is redundant, high performance and deterministic in the transmission of packets. The Midplane Interface includes a Flow Manager 26 with the same queuing and congestion control features discussed in connection with Line Interface/Network Module 24 above.

The IPNOS discussed above has an architectural structure that dovetails perfectly with the IPSG architecture. IPSG 20 has been designed to deliver tailored hardware processing resources to address specific IP services, and IPNOS provides the framework to take advantage of those hardware capabilities. IPNOS is a distributed, object-oriented, multi-processor operating system designed to be scalable by dynamically allocating service elements to the best available resources. All IP services, networks and even physical resources (e.g., processors and access circuits) are managed as objects or groups of objects by IPNOS.

As a service processing OS, IPNOS builds a foundation for customized subscriber-level IP services through the VR concept. IPNOS creates a VR as an object group and has the capacity to create tens of thousands of object groups. As the name implies, an object group is a group of independent objects (of the same or different types). A single object group can contain tens of objects. There are a number of different types of objects in IPNOS: device driver object, link layer object, TCP/IP object, application object, etc.

Figures 10, 11:
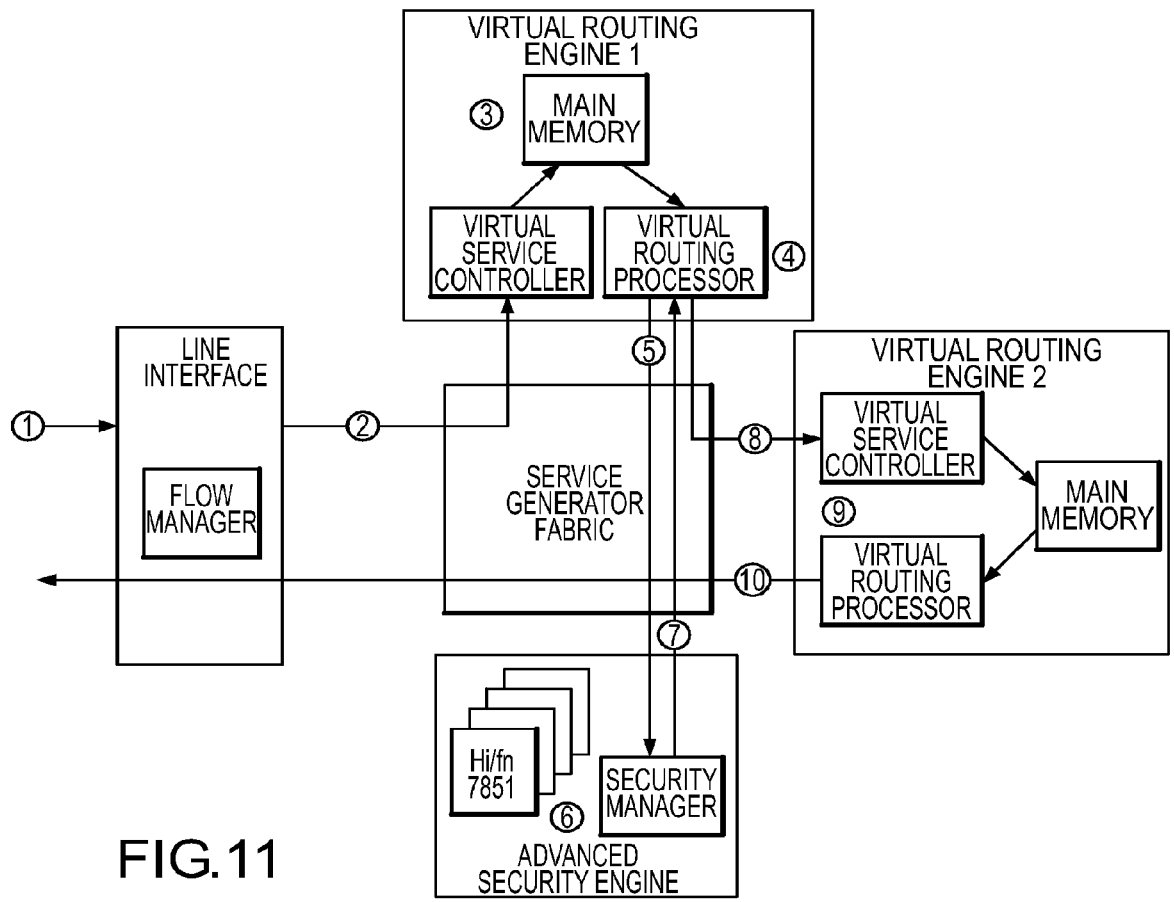
FIG. 10 is a table illustrating layers of the OSI model and roughly corresponding objects of the IPNOS model.
FIG. 11 conceptually illustrates frame processing by an IP Service Generator (IPSG) according to one embodiment of the present invention.

The object model that IPNOS employs conforms roughly to the standard OSI model for networks (see FIG. 10). As in a true object model, objects themselves are comprised of data definitions and various methods. With careful data design, objects enable efficient distributed processing by allowing a larger entity to be split into smaller pieces. Objects execute or .invoke. methods to react to events such as the arrival of data packets. Objects can invoke either their own methods or remote methods residing in other objects. If a recipient object does not yet exist, the requesting object informs the Object Manager, which instantiates the new required object. In this way, objects interact with each other to accomplish larger processing tasks.

One of the pieces of data for each object is the type of processing resource it needs to execute. Thus, when the Object Manager is asked to instantiate a new object, it knows what kind of resource it needs and can draw from the available pool of those tailored resources instead of leveraging only generally available CPUs. For example, when an IPSec tunnel needs to be created, the object group (a VR) requests a new IPSec object to be created on an available ASE. This ability to dynamically distribute processing to tailored resources allows IPNOS to optimize all the processing power designed into the system. In addition, it enables some of the parallelism for packet processing that gives IPSG 20 its ability to operate at wire speed.

This process is described in greater detail in U.S. Pat. No. 7,340,535, described above, the description of which is incorporated herein by reference.

A step-by-step description of a representative packet flow through IPSG 20 will be described next. The illustration in FIG. 11 shows the complete journey of a minimum size frame through an IPSG 20. Customer VLAN-based traffic gets tunneled through a Sub VR EPSec tunnel in VRE-1 and then routed to an SP EP core though an SP VR in VRE-2.

1. An 802.1q VLAN Ethernet packet arrives at a Gigabit Ethernet input port on the Line Interface/Network Module 24. The Flow Manager 26 programs the steering table look-up and decides which VLAN goes to which VRE. Flow Manager 26 tags the packet with an internal control header and transfers it from the Line Interface/Network Module 24 across the Service Generator Fabric 22 to the selected VRE.

2. Upon arrival at the VRE, the packet enters the Virtual Service Controller 32 for deep packet classification. Based on the instructions in the Virtual Service Controller's microcode, various fields of the packet header, i.e., IP source and destination addresses, UDP/TCP source and destination port numbers, IP protocol field, TOS field, IPSec header and SPI field are extracted. An ACL flow associated with the packet is identified. A flow cache is consulted to find out whether the packet should be forwarded in software or hardware. (In this scenario, the packet is to be processed in hardware and an index to the packet processing action cache is obtained.) The ingress VI metering and statistics are registered as part of the ingress flow processing.

3. The packet is deposited via high-speed Direct Memory Access (DMA) into the VRE's main memory and then becomes accessible to the Virtual Routing Processor 30.

4. Virtual Routing Processor 30 retrieves the packet, identifies the packet processing actions that can be achieved in hardware and then performs those actions, such as time-to-live decrement, IP header checksum adjustment and IP forwarding patch matching. The egress statistics counters are updated.

5. The packet is forwarded to the ASE.

6. In the ASE, the packet gets encrypted and time-to-live is decremented. The ASE performs encryption and prepends an IPSec tunnel header.

7. The IPSec tunneled packet is handed back to the Sub VR in the VRE, which decides where to forward the packet (in this case, to the SP VR in VRE-2).

8. As the packet leaves the VRE-1 for the SP VR in VRE-2, the following are processed: a. Egress VI statistics, b. VI metering and marking, c. VI maximum transmit unit enforcement, and d. Packet fragmentation (if necessary).

9. The packet arrives at the SP VR in VRE-2. It goes to the hardware FIB lookup, gets forwarded through the SP VR interface toward the SP core. At the egress, VI statistics and metering are performed.

10. The egress Flow Manager 26 applies priority queuing based on DiffServ marking and transmits the packet out of IPSG 20.

CONCLUSION

Systems and method for providing IP services have been described. The systems and methods described provide advantages over previous systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A system for providing Internet Protocol (IP) services, comprising:
   a switch fabric;
   a line interface/network module coupled to the switch fabric;
   a plurality of virtual routing engines (VREs) coupled to the switch fabric; and
   a virtual services engine (VSE), coupled to the switch fabric, including at least one central processing unit configured to perform firewall processing, Uniform Resource Locator (URL) filtering and anti-virus processing;
   wherein the line interface/network module receives packets and steers ingress packets across the switch fabric to a selected VRE of the plurality of VREs and transmits egress packets according to their relative priority;
   wherein the line interface/network module includes an egress forwarding manager which applies priority queuing to the egress packets based on DiffServ marking and transmits the egress packets out of the line interface/network module;
   wherein the selected VRE determines if a packet associated with a packet flow requires processing by the VSE by performing flow-based packet classification on the packet and evaluating forwarding state information associated with previously stored flow learning results based on a previously received packet of the packet flow; and
   if the packet is determined to require processing by the VSE, then steering the packet across the switch fabric to the VSE for one or more of the firewall processing, the URL filtering and the anti-virus processing.

2. The system of claim 1, further comprising a second VSE.

3. The system of claim 2, wherein the second VSE comprises an advanced security engine (ASE).

4. The system of claim 3, wherein the ASE comprises a plurality of encryption accelerators, a key accelerator and a security manager configured to load balance and manage security sessions across the plurality of encryption accelerators.

5. The system of claim 1, wherein the line interface/network module includes an ingress forwarding manager which maintains a steering table mapping virtual local area networks to one or more VREs of the plurality of VREs.

6. A method for providing Internet Protocol (IP) services comprising:
   providing within a flow manager of a switch a steering table mapping a plurality of virtual local area networks (VLANs) to one or more of a plurality of virtual routing engines (VREs) of the switch;
   receiving a packet associated with a VLAN of the plurality of VLANs at a line interface/network module of a plurality of line interface/network modules of the switch;
   the flow manager steering the packet across a fabric of the switch to a VRE of the plurality of VREs based on a result of a steering table lookup of the VLAN in the steering table;
   the VRE identifying a packet flow with which the packet is associated by performing deep packet classification;
   the VRE determining if the packet requires processing by a virtual services engine (VSE) of a plurality of VSEs of the switch by consulting a flow cache, the VSE including at least one central processing unit configured to perform firewall processing, Uniform Resource Locator (URL) filtering and anti-virus processing;
   if the packet requires processing by the VSE, transferring the packet across the fabric to the VSE for processing;
   if the packet is not dropped or otherwise blocked as a result of one or more of the firewall processing, the URL filtering and the anti-virus processing, the VSE transferring the processed packet back to the VRE for forwarding;
   applying, by an egress forwarding manager of the line interface/network manger, priority queuing to egress packets based on DiffServ marking; and
   transmitting, by the egress forwarding manager, the egress packets out of the line/interface/network module.

7. A system for providing Internet Protocol (IP) services, comprising:
   a fabric;
   a line interface/network module coupled to the fabric;
   a plurality of virtual routing engines (VREs) coupled to the fabric; and
   a virtual services engine (VSE), coupled to the switch fabric, including at least one central processing unit configured to perform firewall processing, Uniform Resource Locator (URL) filtering and anti-virus processing;
   an advanced security engine (ASE) coupled to the fabric;
   wherein the line interface/network module receives packets and steers the packets to a selected VRE of the plurality of VREs based on a result of a steering table lookup;
   wherein the line interface/network module includes an egress forwarding manager which applies priority queuing to egress packets based on DiffServ marking and transmits the egress packets out of the line interface/network module;
   wherein the selected VRE determines if a packet associated with a packet flow requires processing by the one or both of the VSE and the ASE by performing flow-based packet classification on the packet and evaluating forwarding state information associated with previously stored flow learning results based on a previously received packet of the packet flow;
   if the packet has been determined to require processing by the VSE, then steering the packet to the VSE for one or more of the firewall processing, the URL filtering and the anti-virus processing; and
   if the packet is not dropped or otherwise blocked as a result of one or more of the firewall processing, the URL filtering and the anti-virus processing and the packet has been determined to require processing by the ASE, then the VSE steering the processed packet to the ASE for processing.

8. The system of claim 7, wherein the ASE comprises a plurality of encryption accelerators, a key accelerator and a security manager configured to load balance and manage security sessions across the plurality of encryption accelerators.

9. The system of claim 7, wherein the line interface/network module includes an ingress forwarding manager which maintains a steering table mapping virtual local area networks to one or more VREs of the plurality of VREs.

10. The method of claim 6, wherein the switch further comprises an advanced security engine (ASE), including a plurality of encryption accelerators, a key accelerator and a security manager, the method further comprising load balancing and managing security sessions, by the security manager, across the plurality of encryption accelerators.

11. The method of claim 6, wherein the line interface/network module includes an ingress forwarding manager, the method further comprising maintaining, by the ingress forwarding manager, a steering table that maps virtual local area networks to one or more VREs of the plurality of VREs.

* * * * *